(12) United States Patent
Domke et al.

(10) Patent No.: US 6,902,143 B2
(45) Date of Patent: Jun. 7, 2005

(54) MANUAL OVERRIDE ASSEMBLY FOR PILOT-OPERATED VALVE

(75) Inventors: Robert Domke, Glastonbury, CT (US); Kevin Wilson, Somers, CT (US); Dwight H. Matthews, Lexington, MS (US)

(73) Assignee: Parker-Hannifin Corporation, Cleveland, OH (US)

( * ) Notice: Subject to any disclaimer, the term of this patent is extended or adjusted under 35 U.S.C. 154(b) by 84 days.

(21) Appl. No.: 10/622,253

(22) Filed: Jul. 18, 2003

(65) Prior Publication Data

US 2004/0144941 A1 Jul. 29, 2004

Related U.S. Application Data (60) Provisional application No. 60/442,733, filed on Jan. 24, 2003, and provisional application No. 60/447,241, filed on Feb. 13, 2003.

(51) Int. Cl.$^7$ .............................................. F16K 31/00
(52) U.S. Cl. ................. 251/129.03; 251/14; 251/30.02
(58) Field of Search ........................... 251/30.01–30.03, 251/129.03, 14

(56) References Cited

U.S. PATENT DOCUMENTS

| | | | |
|---|---|---|---|
| 2,861,592 A | * | 11/1958 | Collins .................. 137/625.64 |
| 3,236,494 A | | 2/1966 | Frantz |
| 3,429,340 A | * | 2/1969 | Kosmalski et al. ..... 137/625.65 |
| 4,501,299 A | | 2/1985 | Klimowicz et al. |
| 4,643,393 A | | 2/1987 | Kosugi et al. |
| 4,647,007 A | * | 3/1987 | Bajka ..................... 251/129.03 |
| 4,727,899 A | * | 3/1988 | Massey et al. .............. 137/270 |
| 4,916,437 A | | 4/1990 | Gazzaz |
| 5,271,599 A | | 12/1993 | Kolchinsky et al. |
| 5,285,814 A | | 2/1994 | Pettersson et al. |
| 5,372,351 A | * | 12/1994 | Oliver .......................... 251/65 |
| 6,343,615 B1 | * | 2/2002 | Miller et al. ................ 137/202 |
| 6,394,412 B2 | * | 5/2002 | Zakai et al. ............. 251/30.02 |
| 6,684,898 B2 | * | 2/2004 | Wiggins et al. .......... 137/15.25 |

\* cited by examiner

*Primary Examiner*—J. Casimer Jacyna
(74) *Attorney, Agent, or Firm*—Joseph J. Pophal (57) ABSTRACT

In a pilot-operated valve having a valve body, including inlet and outlet portions controllably interconnected via a main piston bore portion; a main piston movable within the main piston bore; an operator portion; an operator assembly including a movable plunger assembly; and an actuating mechanism for actuating the plunger assembly, wherein the improvement comprises a further bore located within the valve body and a manually-operated override assembly retained therein, including a stem having a tool actuating portion; a cam portion extending radially into the operator bore portion and, upon a first predetermined rotation physically actuating the plunger assembly; and an actuating surface extending tangentially into the main piston bore portion which, upon a second rotation physically actuates the main piston. A method of actuating the manual override assembly is also set forth.

32 Claims, 9 Drawing Sheets

MANUAL OVERRIDE ASSEMBLY FOR PILOT-OPERATED VALVE

CROSS-REFERENCE TO RELATED CASES

The present application claims the benefit of the filing date of U.S. Provisional Application Ser. No. 60/442,733 filed Jan. 24, 2003, and U.S. Provisional Application Ser. No. 60/447,241 filed Feb. 13, 2003, the disclosures of which are incorporated herein by reference.

FIELD OF THE INVENTION

The present invention pertains to pilot-operated valves, specifically to manually actuated override assemblies used in valves, such as remote pilot-operated valves and the methods used for operating same.

BACKGROUND OF THE INVENTION

Among typical applications for remote pilot-operated valves, such as for automatic temperature, pressure and time switches, and particularly as solenoid valves, are refrigeration systems where they are often utilized for evaporator temperature control, defrost pump down and heat reclaim systems, for example.

A solenoid valve is an electronically operated device used to control the flow of liquids or gases in a positive, fully-closed or fully open mode. When energized, the solenoid coil provides a strong magnetic force which pulls a steel plunger up into the plunger tube thus opening up the valve orifice in a normally closed valve, thereby permitting the flow of liquids or gases. Pilot-operated valves are among the most widely used solenoid valves.

For servicing and maintenance purposes it is desirable that the normally remotely controlled pilot-operated valves be capable of being opened and closed manually. This is generally accomplished via manual override assemblies or mechanisms built into the valve assemblies. Generally such assemblies, in main piston type valves, take the form of cylindrical plugs that are manually threaded up from under the main valve piston and forcing same off its seating at high force load. A typical prior art construction of this type is set forth in U.S. Pat. No. 3,236,494 to Frantz. Other prior art structures often use rotatable plunger and cam mechanisms of the type typically set forth in U.S. Pat. No. 4,501,299 to Klimowicz et al.; U.S. Pat. No. 4,643,393 to Kogusi et al.; U.S. Pat. No. 4,916,437 to Gazzaz; and U.S. Pat. No. 5,285,814 to Pettersson et al. In the structure set forth in U.S. Pat. No. 5,271,599 to Kolchinsky et al., a cam-actuated control rod extends from the top of the valve through the solenoid sleeve to accomplish the override function.

However, none of these prior art constructions incorporate the dual purpose of overriding both the operator (such as a solenoid) and the main piston of a piston-type pilot-operated valve.

SUMMARY OF THE INVENTION

A feature of the present invention is to provide an improvement in a pilot-operated valve having a valve body, including inlet and outlet portions controllably interconnected via a main piston bore portion having a first orifice; a main piston sealingly movable within the main piston bore in a normally biased sealing relationship relative to the first orifice; and an operator portion, having a second orifice, perpendicular to the main piston bore portion, controllably interconnected with the main piston bore and outlet portions. An operator assembly connected with the operator bore portion, includes a movable plunger assembly normally biased into a sealing relationship relative to the second orifice, thereby blocking the communication between the main piston bore and the outlet portion. An actuating mechanism is provided for controllably actuating the plunger assembly away from the sealing relationship relative to the second orifice, with the second orifice and the plunger assembly cooperating to serve as a pilot portion of the valve. The improvement comprises the addition of a further generally cylindrical bore located within the valve body substantially perpendicular as well as tangential to the main piston bore portion and being perpendicular as well as radial to the operator bore portion. An override assembly is sealably and rotationally controllably retained within this further bore, the assembly including a generally cylindrical stem having a manually-operated sealed tool actuating portion on one end thereof; a sealed cam portion, on the other end of the stem, extending radially into the operator bore portion and, upon a first predetermined extent of rotation of the stem, physically separating the plunger assembly from the sealing relationship with the second orifice. An actuating surface on the stem extends tangentially into the main piston bore portion and, upon a second predetermined extent of rotation of the stem, physically separates the main piston from the sealing relationship with the first orifice.

Other features of the improved pilot-operated valve are that the noted actuating surface is located between the tool actuation portion and the cam portion; that the first and second predetermined extents of rotation are sequential; that the first and second predetermined extents of rotation are each about 90 degrees; and that first and second predetermined extents of rotation are adjacent and substantially sequential.

A further feature of this invention is that, when said valve is not under pressure, the manual override assembly sequentially separates the plunger assembly and the main piston valve from their respective sealing relationships in one continuous about 180 degree rotation.

In another feature, the pilot-operated valve, depending upon the direction of rotation of the stem actuating surface and, depending upon whether the valve is under pressure, either blocks the piston from the sealing relationship with the first orifice or separates the main piston from the sealing relationship with the first orifice.

In yet an additional feature of this invention, the override assembly stem further includes a rotation-directing limiting portion, for the cam portion, which is located intermediate the cam portion and the actuation surface.

Another feature of the present invention includes a method for actuating the improved pilot-operated valve of this invention wherein this valve has a valve body including inlet and outlet portions controllably interconnected via a main piston bore having a first orifice; a main piston sealingly movable within the main piston bore in a normally biased relationship relative to the first orifice; and an operator portion, having a second orifice, perpendicular to the main piston bore portion, controllably interconnected with the main bore and outlet portions. An operator assembly is connected with the operator bore portion and includes a movable plunger assembly normally biased into a sealing relationship relative to the second orifice. An actuating assembly is utilized for controllably actuating the plunger assembly, with the second orifice and the plunger assembly cooperating to serve as a pilot portion of the valve. A further generally cylindrical bore, located within the valve body, is substantially perpendicular as well as tangential to the main piston bore portion and is perpendicular as well as radial to the operator bore portion. An override assembly is sealably retained within the further bore, the override assembly including a generally cylindrical stem having a sealed tool actuating portion on one end thereof, a sealed cam portion on the other end thereof which extends radially into the operator bore portion, and an actuating surface on the stem that extends tangentially into the main piston bore portion. The method comprising the steps of: manually rotating the tool actuating portion for a predetermined extent of rotation of the override assembly; physically separating the plunger assembly from its sealing relationship with the second orifice during a first portion of the predetermined extent of rotation; and physically separating the main piston from its sealing relationship with the first orifice during a second portion of the predetermined extent of rotation.

Other features of the method for actuating the improved pilot-operated valve of this invention include that the said first and second portions of the predetermined extent of rotation are adjacent and sequential; that the first and second portions of the predetermined extent of rotation are each about 90 degrees; and wherein the predetermined extent of rotation consists of one continuous about 180 degree rotation of the override assembly.

Another feature of the method for actuating the improved pilot-operated valve of this invention is that, when the valve is not under pressure, the noted manual rotating of the tool actuating portion sequentially physically separates the plunger assembly and the piston valve from their respective sealing relationships in one continuous about 180 degree rotation encompassing both the first and second portions of the predetermined extent of rotation; and wherein, depending upon the direction of manual rotating of the stem actuating surface and, depending upon whether the valve is under pressure, either blocks the piston from the sealing relationship with the first orifice or separates the main piston from the sealing relationship with the first orifice during the second portion of the predetermined extent of rotation.

Finally, in the method for actuating the improved pilot-operated valve of this invention, the first portion of the predetermined extent of rotation further includes another portion of the stem for limiting the rotation-direction of the cam portion.

The foregoing advantages, construction and method of operation of the present invention will become more readily apparent from the following description in conjunction with the accompanying drawings.

BRIEF DESCRIPTION OF THE DRAWINGS

Similar numerals refer to similar parts throughout the several drawings.

DETAILED DESCRIPTION OF THE PREFERRED EMBODIMENT

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is but an example and the invention is not limited to the exact details shown and described.

As part of the noted detailed description, a brief reference will initially be made relative to the operation of a remote pilot-operated valve. The relationship between a P1 inlet pressure, a P2 outlet pressure and a P3 pressure behind the main orifice piston, is the key to understanding how such a valve operates. When the valve is closed, i.e., when the main orifice piston blocks the main orifice between the valve inlet and the valve outlet, P3 is equal to P1 because pressurized fluid is able to flow to the backside of the piston through at least one equalizer hole. The piston seals off the main orifice by force exerted, via a spring, on the backside of the piston, with P2 thus being less than P1. A pilot orifice is sealed by the plunger of a remote controlled operator, such as a solenoid operator, thus preventing P3 pressure from exhausting to the valve outlet portion.

When it is desired to open the closed valve, the remote operator is actuated and, in the case of a solenoid operator, the magnetic plunger is lifted off the pilot orifice by magnetic force. Pressurized fluid, on the backside of the piston is thereafter exhausted through the pilot orifice into the valve outlet portion. Since the pilot orifice opening is considerably larger than the piston equalizer hole, pressurized fluid is exhausted from the backside of the piston faster than the pressurized fluid entering through the equalizer hole, with the rapid exhausting of the backside of the piston causing P3<P1. The resulting difference between P3 and P1 is sufficient that the resultant force on the piston overcomes the spring force, thereby displacing the piston off the main orifice, and enabling pressurized fluid to flow through the main orifice, i.e., permitting such fluid flow directly from the valve inlet portion to the valve outlet portion. Those persons skilled in the art will appreciate that this typical valve operation also applies to the operation of the valve of this invention.

Figure 4:
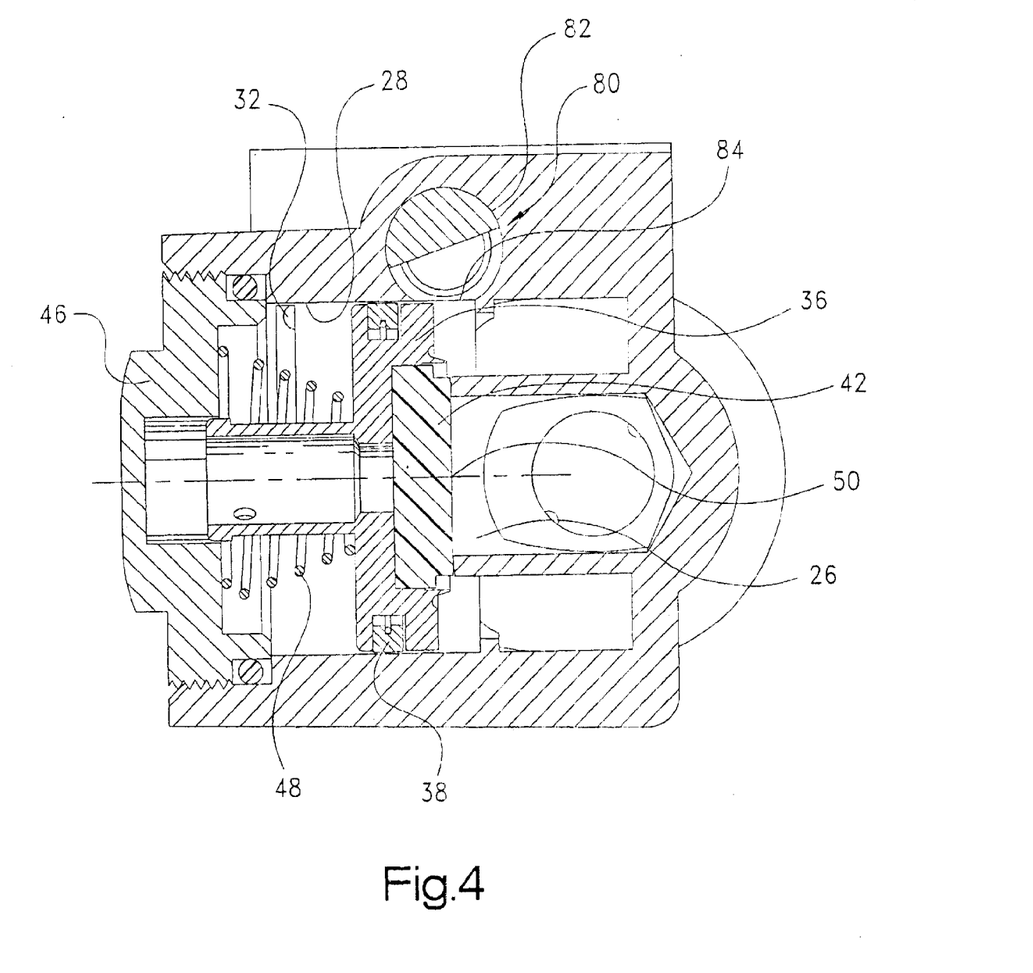
FIG. 4 is an enlarged lateral cross-sectional view of the valve of FIG. 3, taken along line B—B thereof showing a transverse section of the manual override valve assembly.
Figure 5:
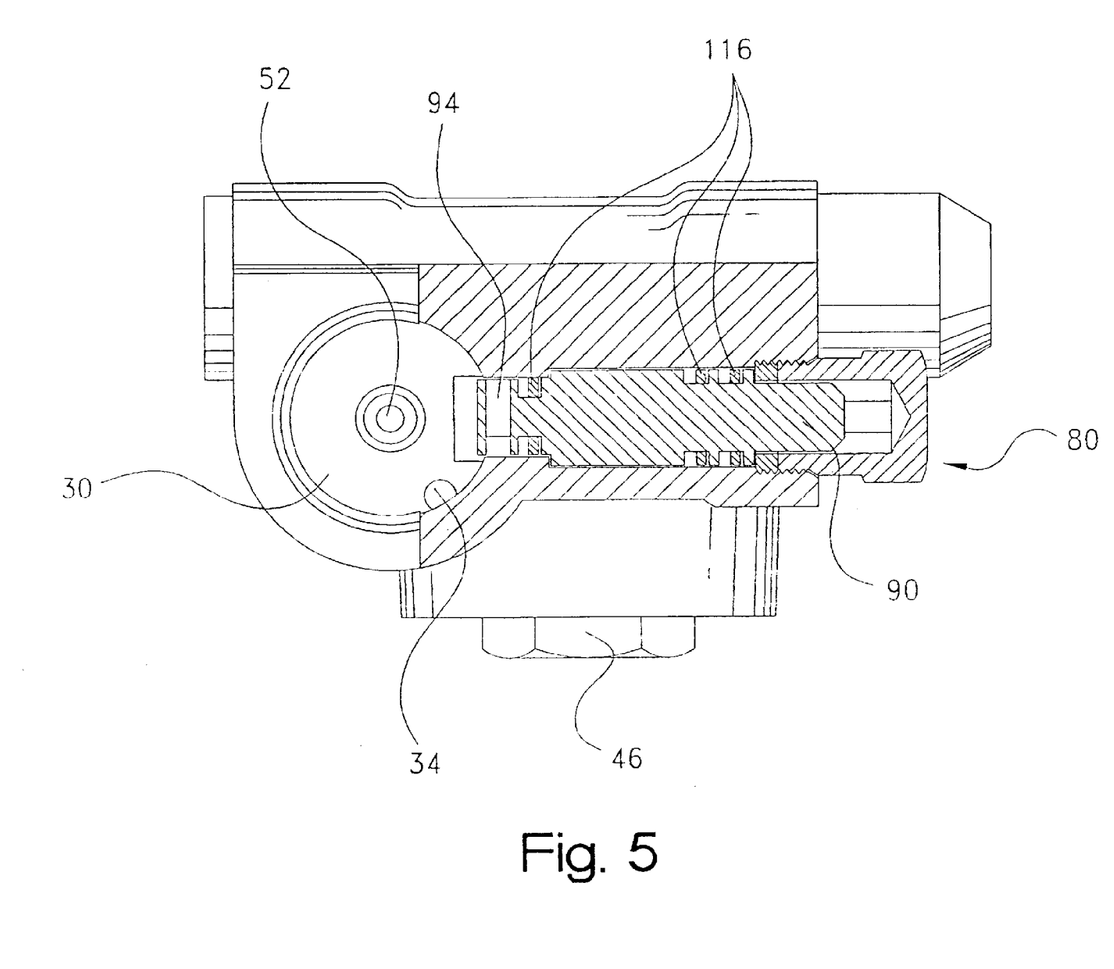
FIG. 5 is an enlarged sectional view, taken along line 5—5 of FIG. 3, showing the pilot orifice cavity and a horizontal cross-sectional view of the manual override stem.
Figure 6:
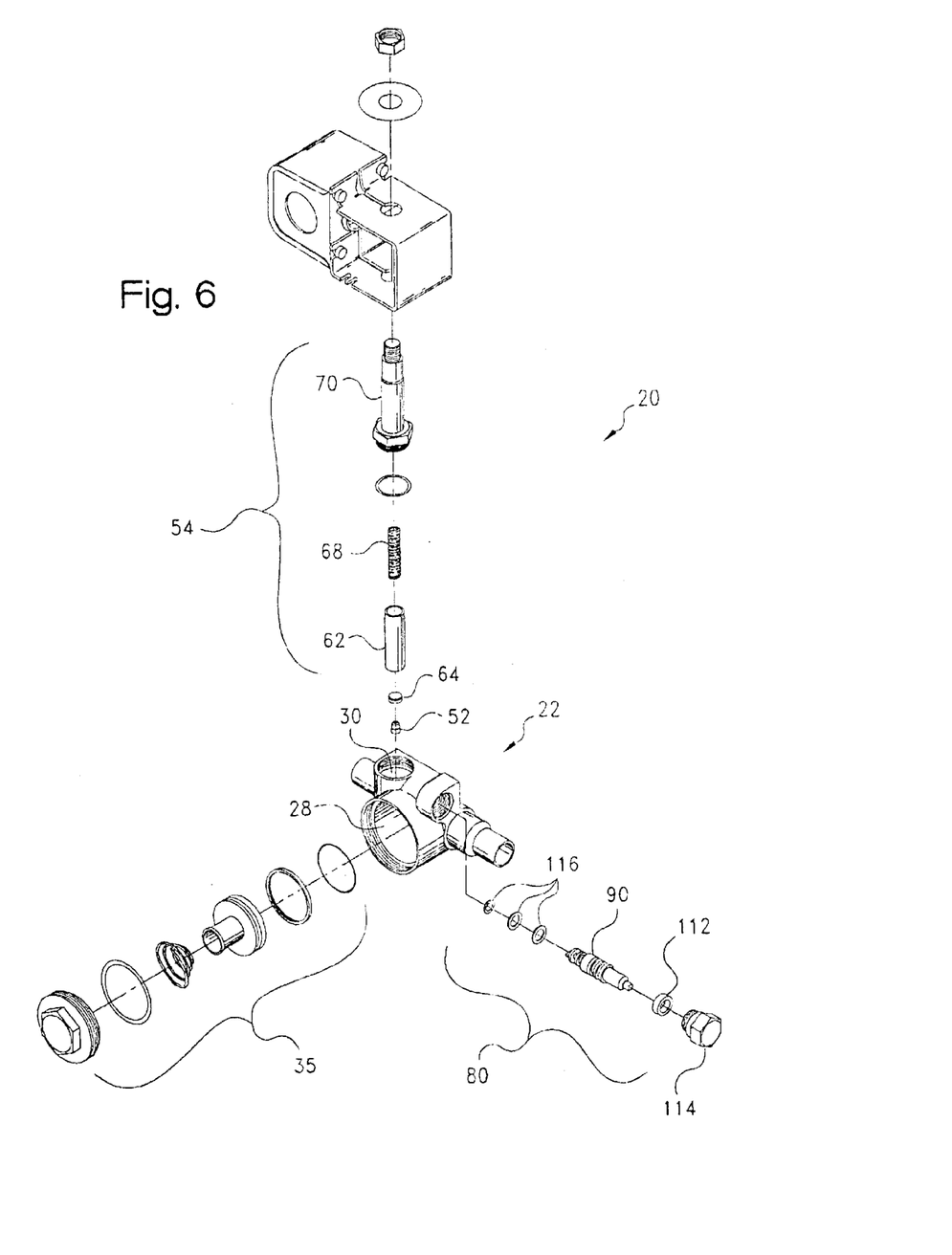
FIG. 6 is an exploded view of the valve of this invention, particularly the manual override assembly.

Turning now to the drawings, and particularly to FIGS. 1–6, there is shown a remote pilot-operated valve 20 having a manual override assembly 80, which will be discussed in more detail relative to FIGS. 7–12. Basically, valve 20 takes the form of a remote pilot-operated piston-type solenoid valve having a valve body 22 including an inlet portion 24 and an outlet portion 26, separated by a main piston bore portion 28 as well as including an operator bore portion 30. Valve body 22 is machined with the operator bore portion 30 and main piston bore portion 28 being at 90 degrees to each other, with operator bore portion 30 also being longitudinally offset, relative to main piston bore portion 28, as best seen in FIG. 6. An arcuate internal bore 32, best seen in FIGS. 4 and 5, connects main piston bore portion 28 with operator bore portion 30. A further arcuate internal bore 34, best seen in FIG. 5, connect operator bore portion 30 with outlet portion 26.

Slidably, sealingly retained within main piston bore portion 28 is a main piston assembly including a piston 36 equipped with the customary piston ring 38 and an integral piston rod 40 extending from the outer end force thereof. The inner end force or back side of piston 36 is equipped with a circular, elastic, central seal member 42 adapted to sealingly engage with an annular main orifice 44 at the inner end of main piston bore portion 28. The outer end of main piston bore portion 28 is sealingly closed via a threaded cap or cover 46. A spring member 48, piloted by piston rod 40, is interposed between cover 46 and piston 36, for biasing piston 36 against annular main orifice 44. Piston 36 also includes an axial equalizer hole or orifice 50 that permits pressurized fluid flow from inlet portion 24 to the backside of piston 36 and flow from there to a pilot orifice 52 in operator bore portion 30 via internal bore 32.

The operator bore portion 30 of valve body 22 serves to threadingly receive a corresponding-threaded annular attaching portion 58 of an attachment nut 56 that serves to attach a known solenoid actuation assembly 54 of the normally-closed (NC) type. Solenoid assembly 54 includes a movable plunger assembly including a magnetic-material plunger member 62 having a circular elastic seal member 64 on its axial outer end portion, together with a biasing spring 68, all of which are sheathed in a sleeve assembly 70 which in turn is surrounded by an electrically arcuatable coil 72 within an enclosure 74. The operation of a solenoid mechanism is of course well known in the art. In the NC type solenoid utilized here, plunger member 62, with its seal member 64 is normally biased against and seals pilot orifice 52. Upon remote electrical operation, plunger member 62 is lifted off or separated from pilot orifice 52 by magnetic force, thus permitting fluid pressure communication from behind main piston 36 and outlet portion 26, during the movement of main piston 36 from a valve-closed position to a valve-open position. The operation of the above-described valve structure, in conjunction with the previously recited method of operation of such remote pilot-operated valves is deemed to be well-known and understood to those skilled in this art.

As best seen in the exploded view in FIG. 6, remote pilot-operated valve 20 is basically comprised of valve body assembly 22, main piston assembly 35, and solenoid actuation assembly 54, together with the novel manual override assembly 80 of this invention which will now be described in detail.

As best seen in FIGS. 1, 2, 4 and 6, manual override assembly 80 is sealingly rotatably retained in a stepped override assembly bore 82, in valve body 22 substantially perpendicular and tangential to main piston bore portion 28 as well as perpendicular and radial to operator bore portion 30. The location of override assembly bore 82 is so chosen that an intermediate small peripheral portion thereof just barely intersects and interrupts the outer peripheral wall portion 29 of main piston bore portion 28, as best seen in FIGS. 4 and 6, in the form of a small arcuate window portion 84, bounded on its lower axial extent at a flange portion 78 of the inner end of bore portion 28, with flange portion 78 being in an adjacent parallel plane with the one wherein piston elastic seal member 42 bottoms out on axial orifice 50. The upper axial extent of window 84 terminates within main piston bore peripheral wall portion 29 axially outwardly of inner flange portion 78. The inner radial end of window portion 84 is substantially perpendicular to flange portion 78 while the outer radial end takes an arcuate shape that curves into the axial components of window portion 84.

Figure 1:
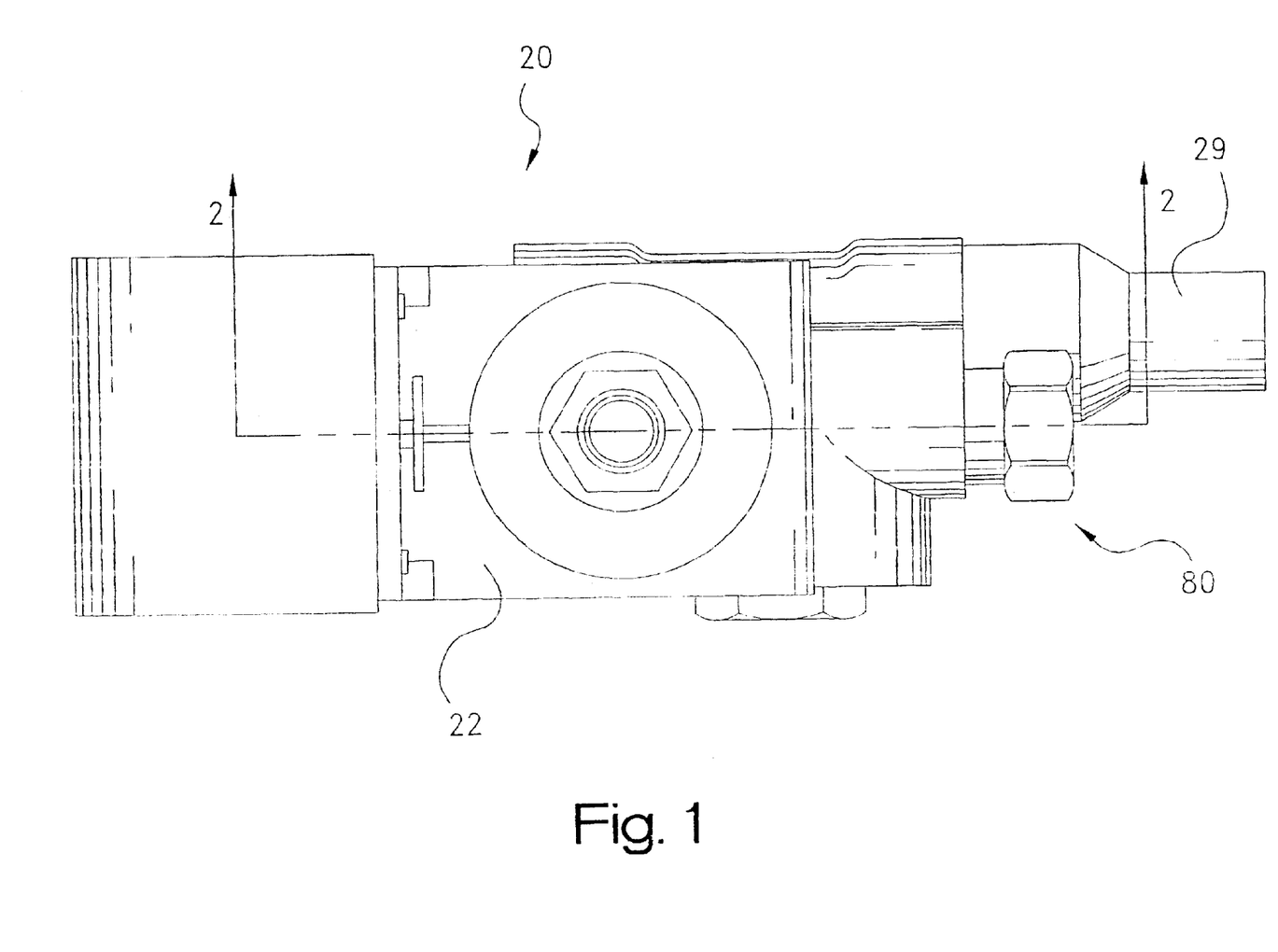
FIG. 1 is a top plan of a valve incorporating the manual override assembly of this invention.
Figure 2:
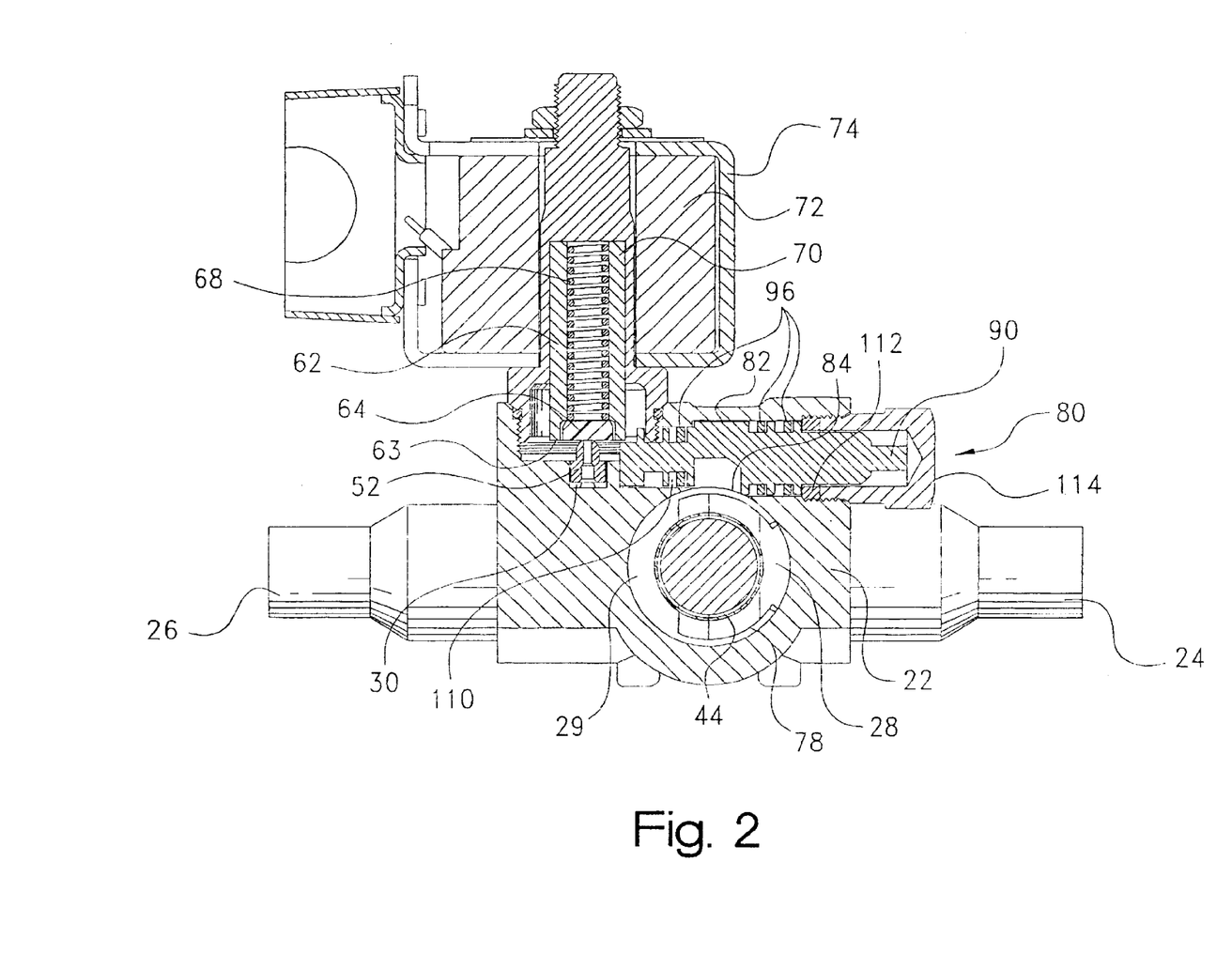
FIG. 2 is an enlarged longitudinal vertical cross-sectional view of the valve of FIG. 1, taken along line A—A thereof showing a longitudinal section of the manual override assembly.
Figure 3:
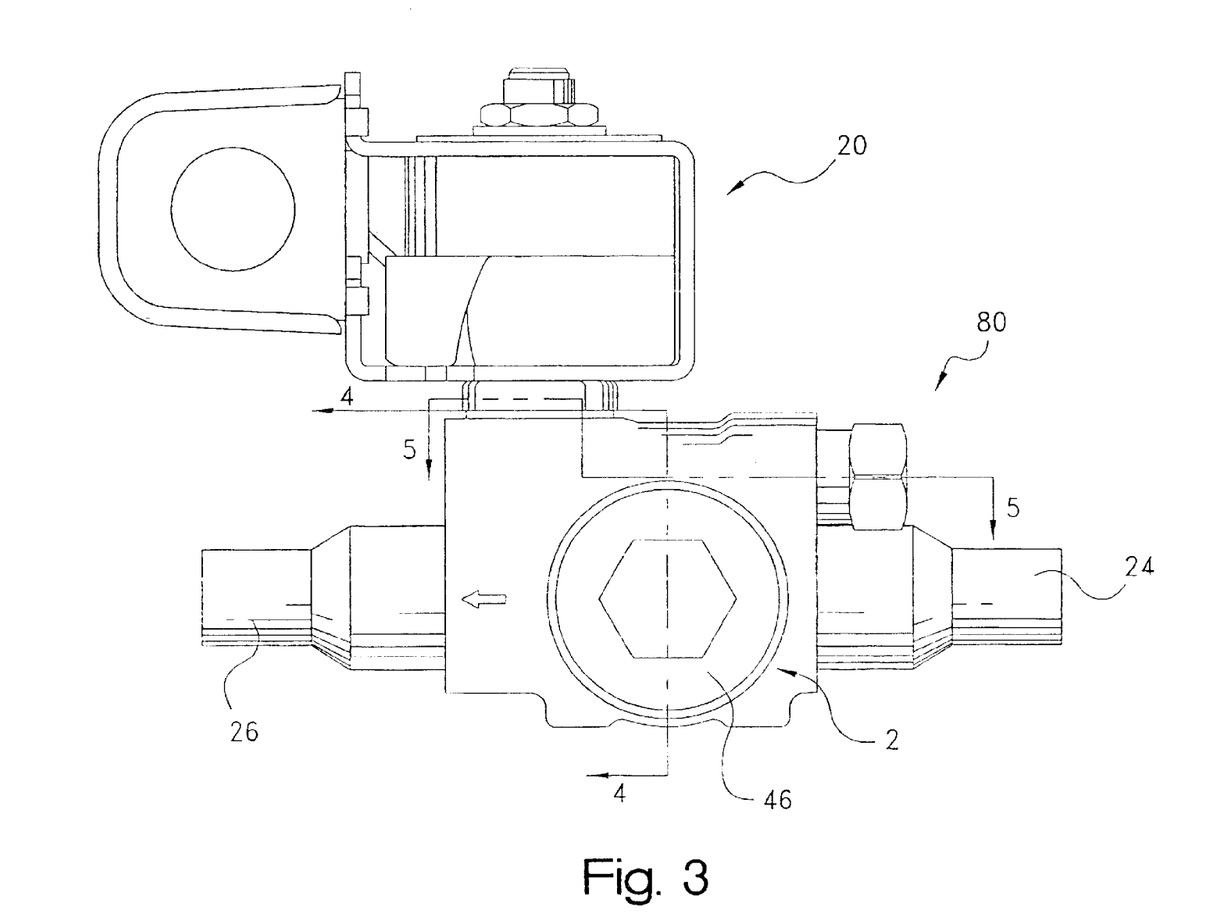
FIG. 3 is an elevational side view of the valve of this invention.

The axial inner end of override assembly bore 82 extends into and terminates partial within operator bore portion 30, as best seen in FIGS. 2 and 5. Manual override assembly 80, as best seen in FIG. 6, principally consists of a stepped, generally cylindrical override stem 90, override stem retainer 112, override cap 114 and a plurality of strategically placed sealing O-rings 116, the latter serving to seal override stem 90 relative to its stepped bore 82.

Figure 7:
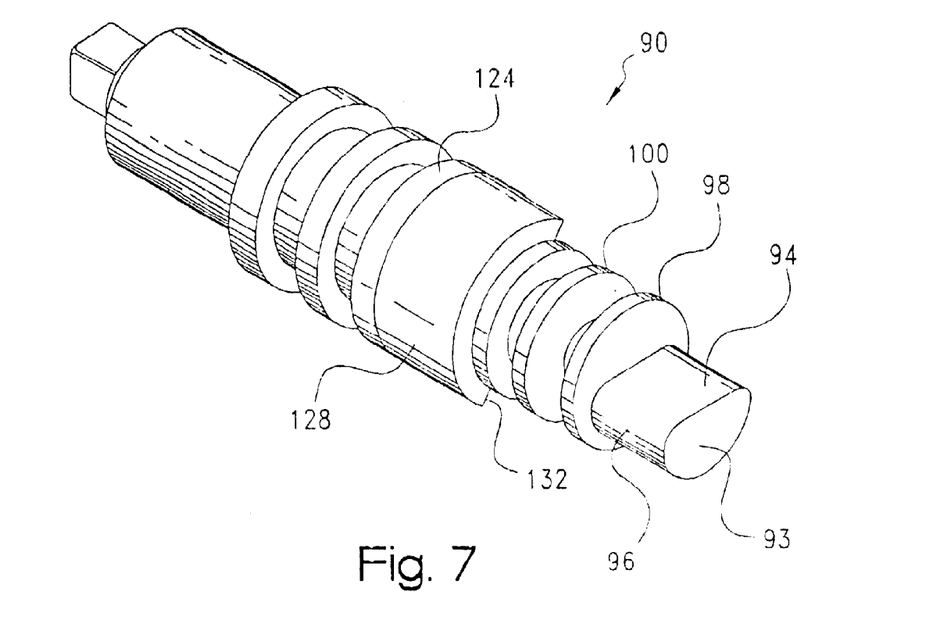
FIG. 7 is a perspective view of the override stem of the manual override assembly of this invention.
Figure 11:
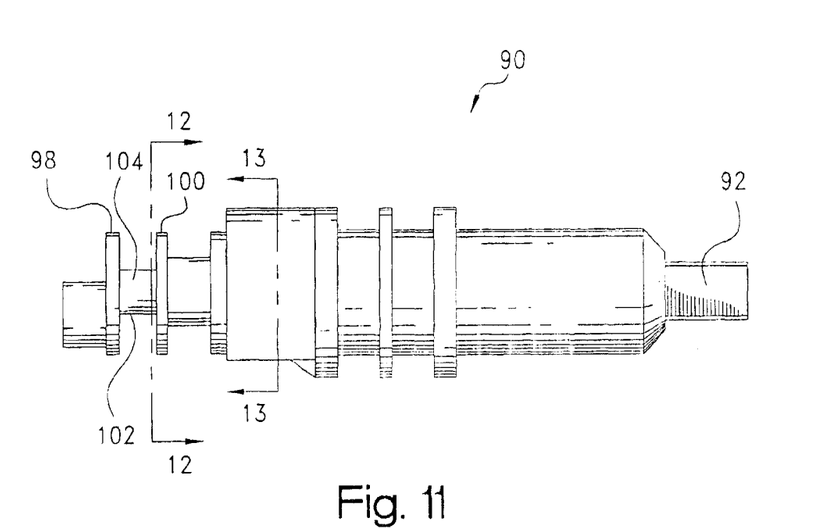
FIG. 11 is a full longitudinal view of the section shown in FIG. 9.
Figure 12:
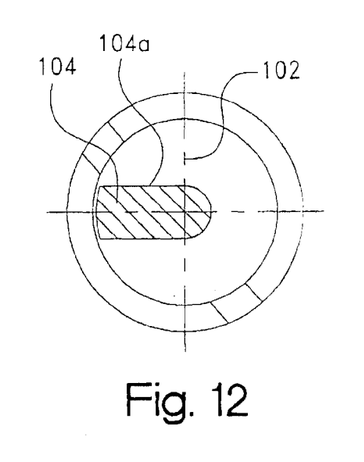
FIG. 12 is an enlarged transverse sectional view taken along line E—E of FIG. 11.
Figure 13:
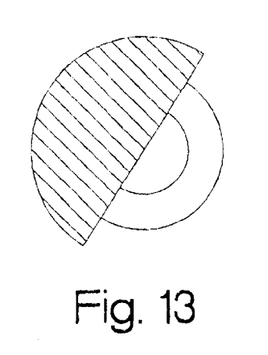
FIG. 13 is an enlarged transverse sectional view taken along line C—C of FIG. 11.

Turning now to FIGS. 7–13, these figures serve to disclose and define the shape and function of override stem 90. As best seen in FIGS. 7 and 11 stem 90 is generally cylindrical and is provided on the outer end, that extends from bore 82 (FIG. 1) with a tool actuation portion 92 which may take any desired shape, such as a square drive as shown (for a wrench, etc.) or a slotted shape (for a screwdriver) or an aperture for inserting a handle, etc. The inner end of stem 90 takes the form of a cam that extends into operator bore portion 30, (see FIG. 5) and includes a flat portion 94 that blends into an arcuate camming surface 96, as best seen in FIG. 7. Adjacent to the inner end of cam 93 are two spaced cylindrical portions 98 and 100 concentric with the longitudinal axis of stem 90. Cylindrical portion 98, which also extends into operator bore portion 38, is separated from cylindrical portion 100 by a discontinuous peripheral groove portion 102 defined by the opposed annular walls of cylindrical portions 98, 100 and a radial joining bridge portion 104, as best seen in FIGS. 11 and 12. The upper surface 104*a* of bridge portion 104 is parallel with cam flat surface 94. As best seen in FIGS. 2 and 5, since a substantial axial extent of bridge portion 104 and thus groove portion 102 extend into operator bore portion 28, the radial extent of cylindrical portion 100 is so dimensioned that a section of the inner peripheral surface of threaded portion 58 of solenoid actuating assembly attachment nut 56, upon the assembly of solenoid actuation assembly 54, extends into discontinuous groove portion 106, thus limiting the axial movement of override stem 90 and rotatably retaining same in override assembly bore 82. At the same time, bridge portion 104, by virtue of its partial extent into operator bore groove 102, prohibits the rotation of override stem 90 by bottoming out in one direction of rotation against noted threaded portion 56 of solenoid assembly attachment nut 56 and bottoming out in the other direction of rotation after about 180 degrees of rotation or about one-half turn of stem 90.

Cylindrical portion 100 is separated from adjacent cylindrical portion 106 by a coaxial bridge portion 108 thus defining a continuous peripheral groove portion 140 that serves to retain a sealing O-ring 196 (FIG. 2). The other side of cylindrical portion 106 is joined to an annular continuous peripheral groove portion 120 via an eccentric bridge portion 122 having a cylindrical portion 124 forming one edge of groove portion 120. Eccentric bridge portion 122 is provided with a transverse flat area or surface 126 where lateral ends or edges 132 merge into a semicylindrical surface portion 128.

Figure 8:
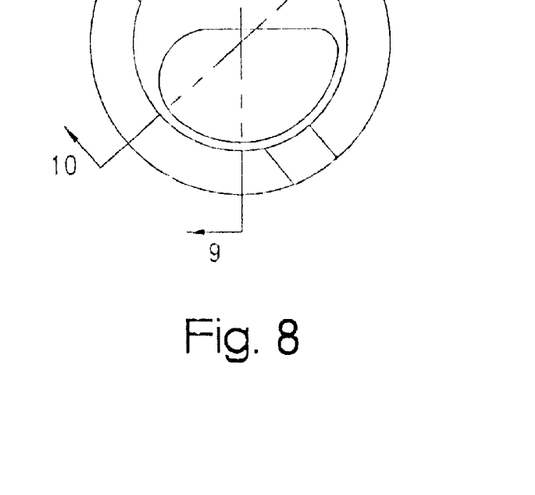
FIG. 8 is an end view of the override stem of FIG. 7.
Figure 9:
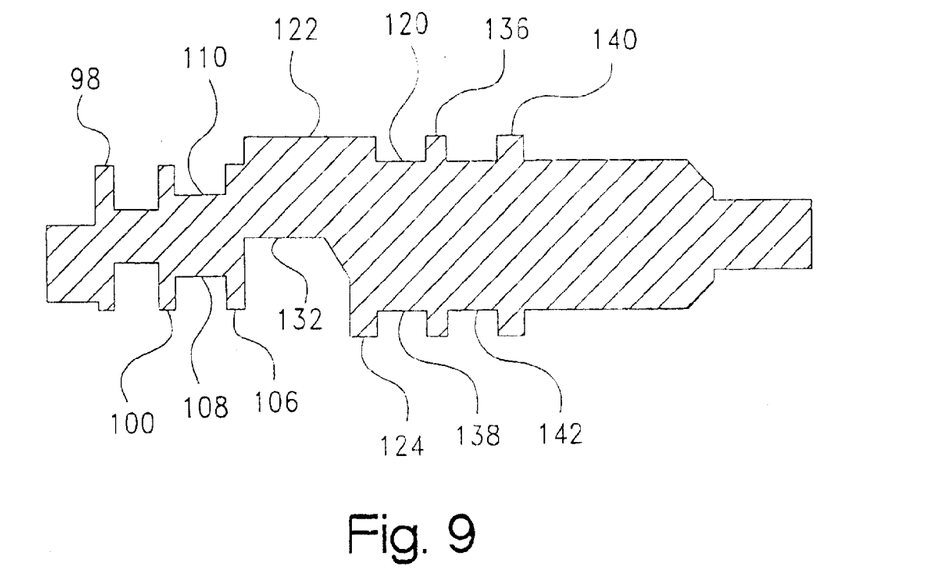
FIG. 9 is a longitudinal cross-sectional view, taken along line A—A of FIG. 8.
Figure 10:
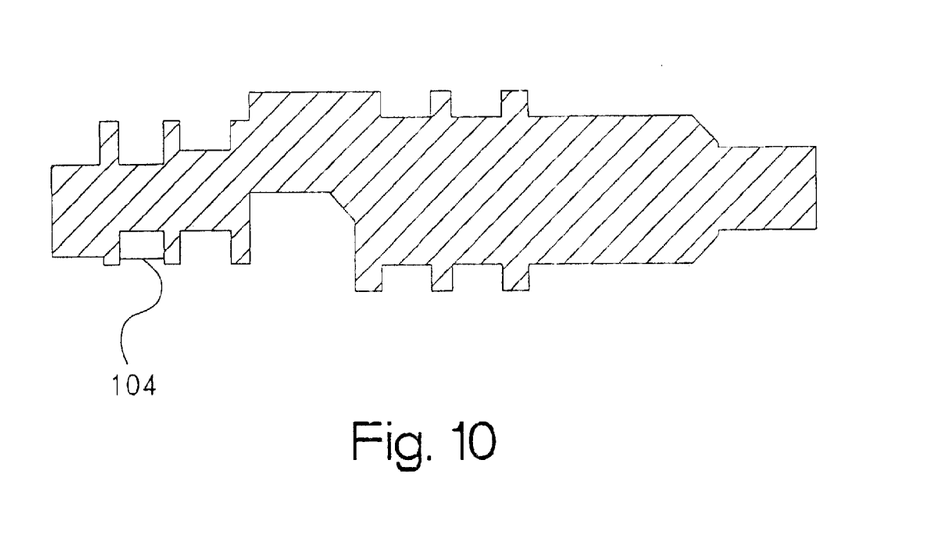
FIG. 10 is a view of the area defined within broken circle line 10—10 of FIG. 9, showing a 22 degree clockwise off-set, relative to that of FIG. 9, taken along line B—B of FIG. 8.

As best seen in FIGS. 7, 8 and 12, the angulation of area or surface 126, and thus of lateral edge 132 may be slightly rotationable offset, at a range of about 40 to 60 degrees clockwise, relative to the transverse centerline of override stem 90, as seen in FIG. 8, and thus may be similarly offset relative to flat surface 94 of cam 93. Preferably, this offset range is about 45 to 55 degrees and optimally at 50 to 55 degrees. This optional offset is not mandatory but does offer a bit of additional dwell or overlap between the actuation of cam surface 96 and the subsequent actuation of lateral edge 132, as will be discussed in more detail hereinafter.

Defined between spaced cylindrical portion 124, 136 and 140 are annular cylindrical grooves 138 and 142, respectively, that serve to retain further sealing O-rings 96 (FIGS. 2, 6). As best seen in FIG. 2, an override stem retainer 112 is preferably threaded into stepped bore 82 for further axially retaining override stem 90 in bore 82 when solenoid actuation assembly 54 is removed from valve body 22. In addition, an override cap 114 is also threaded into stepped bore 82 and is removed only if and when there is a reason to manually activate override assembly 80.

As best seen in FIG. 2, when override assembly 80 is installed in its bore 82, such that cam flat surface 94 is parallel with the bottom wall surface 63 of plunger member 62, override stem bridge portion upper surface 104a (FIG. 12), when override stem 80 is turned in the counterclockwise direction, will after a slight rotation engage the bottom annular surface of solenoid attachment nut threaded portion 56 and thus be stopped from further rotation. If override stem 90 is turned clockwise, camming surface 96 will, after a slight rotation, engage plunger member bottom surface 63 and axially displace same away from engagement with pilot orifice 52, with maximum displacement occurring after an about 90 degree displacement, or an about one-quarter turn, of override stem 90. This, of course, permits pressurized fluid transfer from behind main piston 36 to outlet portion 26, via pilot orifice 52.

This just noted displacement has also caused the rotation of one of the lateral flat edges 132 of stem eccentric bridge portion 122 to laterally enter the main piston bore peripheral wall portion 29 at inner flange portion 78, and there starts to make physical contact with the innermost peripheral outer edge surface of piston 36 as best seen in FIG. 2. Further clockwise rotation will cause flat edge 132 to engage the noted piston surface and axially displace same away from engagement with annular main orifice 44, with maximum displacement occurring after an about further 90 degree displacement, or an about further one-quarter turn, of override stem 90. This of course permits pressurized fluid transfer from inlet portion 24 to outlet portion 26, via annular main orifice 44.

Thus, the rotation or turning of the one override valve stem 90 with but a one-half turn causes same to lift solenoid operator plunger member or armature 62 during the first one-quarter turn and then to lift main piston 36 during the second one-quarter turn. When valve 20 is under pressure, pilot orifice 52 is opened, and main piston 36 shifts, via pressurized fluid opening away from main orifice 44 of valve 22. By continuing to turn manual override stem 90, main piston 36 is blocked open upon the reduction of pressure, which provides a noticeable time saving advantage in, for example, charging refrigeration systems.

If valve 20 is not under or subject to fluid pressure, manual override stem 90 sequentially first lifts solenoid plunger member 62 and then lifts main valve piston 36 in one easy about one-half turn. This combined sequential action is much more efficient than existing manual override mechanisms that merely thread up a plunger from underneath the main piston bore and force the piston off its orifice seat, requiring a high force load. The flattened lever action, via the flat lateral edge 132 of the intermediate portion of override stem 90 enters main piston bore portion 28 through the arcuate or curved window portion 84. As a result of the rotation of override stem 90, the flat lateral edge rotates in and out of piston bore portion 82, thus either blocking or lifting main piston 36, depending upon whether fluid pressure is acting on main piston 36.

While there is shown and described a present preferred embodiment of this invention, it is to be distinctly understood that the invention is not limited thereto, but may be otherwise variously embodied and practiced within the scope of the following claims.

What is claimed is:

1. In a pilot-operated valve having:
   a. a valve body, including an inlet portion and an outlet portion, said inlet and outlet portions adapted to be controllably interconnected via a main piston bore portion having a first orifice and a main piston, one relatively movable to the other; and an operator bore portion, having a second orifice, perpendicular to said main piston bore portion adapted to be controllably interconnected with said main piston bore portion and said outlet portion; and
   b. an operator/actuator assembly, operatively attached to said valve body operator bore portion, including a normally closed plunger assembly adapted to be in a sealing relationship relative to said second orifice, thereby blocking the communication between said main piston bore portion and said valve body outlet portion; and an actuating mechanism for controllably actuating said plunger assembly into a non-sealing relationship relative to said second orifice, said second orifice and said plunger assembly serving as a pilot portion of said valve, the improvement comprising:
      i. an override assembly bore located within said valve body substantially perpendicular and tangential to said main piston bore portion as well as being perpendicular and radial to said operator bore portion; and
      ii. a manual override assembly sealingly and controllably rotationally retained within said override assembly bore, said assembly including a generally cylindrical stem having a tool actuation portion, on one end of said stem, extending from said override assembly bore; a cam portion, on the other end of said stem, extending radially into said valve body operator bore portion and adapted, upon actuation of said override assembly, to physically separate said plunger assembly from a sealing relationship between said plunger assembly and said second orifice; and an actuating surface, intermediate said tool actuation portion and said cam portion, extending tangentially into said main piston bore portion and adapted, upon actuation of said override assembly, to physically separate said main piston from a sealing relationship between said main piston and said first orifice.

2. The improved pilot-operated valve of claim 1, wherein the manual actuation of said plunger assembly, via said cam portion, and of said main piston, via said actuating surface, is sequential.

3. The improved plunger assembly of claim 2, wherein the actuation of said plunger assembly is fully completed prior to the actuation of said piston.

4. The improved pilot-operated valve of claim 3, wherein the actuation of said plunger assembly is completed within a first 90-degree rotation of said stem.

5. The improved pilot-operated valve of claim 4, wherein the actuation of said main piston is completed within a second 90-degree rotation of said stem.

6. The improved pilot-operated valve of claim 5, wherein said first and second 90 degree rotations are adjacent and sequential.

7. The improved pilot-operated valve of claim 6, wherein the actuations of said plunger and said main piston are separated via a predetermined rotational dwell period of said stem.

8. The improved pilot-operated valve of claim 7, wherein the rotational dwell period of said stem is in the range of 50 to 55 degrees.

9. The improved pilot-operated valve of claim 1, wherein said stem further includes a rotation-direction limiting portion, for said cam portion, intermediate said cam portion and said actuation surface.

10. The improved pilot-operated valve of claim 1, wherein said actuating mechanism for said plunger assembly takes the form a remote-controlled solenoid.

11. The improved pilot-operated valve of claim 1, wherein said main piston is normally biased into a sealing relationship with said first orifice.

12. The improved pilot-operated valve of claim 1, wherein, when said valve is under pressure, once said pilot portion is opened by the manual action of said stem cam portion, said piston is shifted, via said pressure, away from a sealing relationship with said first orifice, thereby opening said first orifice and thus permitting communication between said inlet and outlet portions.

13. The improved pilot-operated valve of claim 10, wherein, upon the completion of the continued manual actuation of said stem, said actuating surface blocks said piston, away from a sealing relationship with said first orifice, when said valve is not under pressure.

14. The improved pilot-operated valve of claim 1, wherein, when said valve is not under pressure, said manual override assembly sequentially separates said plunger assembly and said main valve piston in one continuous 180 degree turn of said stem.

15. The improved pilot-operated valve of claim 1, wherein, depending both upon the direction of rotation of said stem actuating surface and whether said valve is under pressure, one of blocks said piston from a sealing relationship with said valve first orifice and separates said main piston from a sealing relationship with said first orifice.

16. The improved pilot-operated valve of claim 1, further including a plurality of O-ring seals on said stem for sealing said cam portion and said actuating surface.

17. A pilot-operated valve having a valve body, having inlet and outlet portions controllably interconnected via a main piston bore portion having a first orifice; a main piston sealingly movable within said main piston bore in a normally biased sealing relationship relative to said first orifice; and an operator portion, having a second orifice, perpendicular to said main piston bore portion, controllably interconnected with said main piston bore and outlet portions; an operator assembly connected with said operator bore portion, including a movable plunger assembly normally biased into a sealing relationship relative to said second orifice, thereby blocking the communication between said main piston bore and said outlet portion; and an actuating mechanism for controllably actuating said plunger assembly away from the sealing relationship relative to said second orifice, said second orifice and said plunger assembly cooperating to serve as a pilot portion of said valve, an improvement comprising:

a. a further generally cylindrical bore located within said valve body substantially perpendicular as well as tangential to said main piston bore portion and being perpendicular as well as radial to said operator bore portion; and b. an override assembly sealably and rotationally controllably retained within said further bore, said assembly including a generally cylindrical stem having a manually-operated sealed tool actuating portion on one end thereof; a sealed cam portion, on the other end of said stem, extending radially into said operator bore portion and, upon a first predetermined extent of rotation of said stem, physically separating said plunger assembly from said sealing relationship with said second orifice; and an actuating surface on said stem extending tangentially into said main piston bore portion and, upon a second predetermined extent of rotation of said stem, physically separating said main piston from said sealing relationship with said first orifice.

18. The improved pilot-operated valve of claim 17, wherein said actuating surface is located between said tool actuation portion and said cam portion.

19. The improved pilot-operated valve of claim 17, wherein said first and second predetermined extents of rotation are sequential.

20. The pilot-operated valve of claim 19, wherein said first predetermined extent of rotation is about 90 degrees.

21. The pilot-operated valve of claim 20, wherein said second predetermined extent of rotation is about 90 degrees.

22. The pilot-operated valve of claim 21, wherein said first and second predetermined extents of rotation are adjacent and substantially sequential.

23. The pilot-operated valve of claim 17, wherein, when said valve is not under pressure, said manual override assembly sequentially separates said plunger assembly and said main piston valve from their respective sealing relationships in one continuous about 180 degree rotation.

24. The pilot-operated valve of claim 17, wherein, depending upon the direction of rotation of said stem actuating surface and, depending upon whether said valve is under pressure, either blocks said piston from the sealing relationship with said first orifice or separates said main piston from the sealing relationship with said first orifice.

25. A method for actuating a pilot-operated valve having a valve body including inlet and outlet portions controllably interconnected via a main piston bore having a first orifice; a main piston sealingly movable within said main piston bore in a normally biased relationship relative to said first orifice; and an operator portion, having a second orifice, perpendicular to said main piston bore portion, controllably interconnected with said main bore and outlet portions; an operator assembly connected with said operator bore portion, including a movable plunger assembly normally biased into a sealing relationship relative to said second orifice; an actuating assembly for controllably actuating said plunger assembly, said second orifice and said plunger assembly cooperating to serve as a pilot portion of said valve; a further generally cylindrical bore, located within said valve body, substantially perpendicular as well as tangential to said main piston bore portion and being perpendicular as well as radial to said operator bore portion; and an override assembly sealably retained within said further bore, said override assembly including a generally cylindrical stem having a sealed tool actuating portion on one end thereof, a sealed cam portion on the other end thereof extending radially into said operator bore portion, and an actuating surface on said stem extending tangentially into said main piston bore portion, said method comprising the steps of:

a. manually rotating said tool actuating portion for a predetermined extent of rotation of said override assembly;

b. physically separating said plunger assembly from said sealing relationship with said second orifice during a first portion of said predetermined extent of rotation; and c. physically separating said main piston from said sealing relationship with said first orifice during a second portion of said predetermined extent of rotation.

26. The method of claim 25, wherein said first and second portions of said predetermined extent of rotation are adjacent and sequential.

27. The method of claim 26, wherein said first portion of said predetermined extent of rotation is about 90 degrees.

28. The method of claim 27, wherein said second portion of said predetermined extent of rotation is about 90 degrees.

29. The method of claim 25, wherein said predetermined extents of rotation consists of one continuous about 180 degree rotation of said override assembly.

30. The method of claim 25, wherein, when said valve is not under pressure, said manual rotating of said tool actuating portion sequentially physically separates said plunger assembly and said piston valve from their respective sealing relationships in one continuous about 180 degree rotation encompassing both said first and second portions of said predetermined extent of rotation.

31. The method of claim 25, wherein, depending upon the direction of manually rotating of said stem actuating surface and, depending upon whether said valve is under pressure, either blocks said piston from the sealing relationship with said first orifice or separates said main piston from the sealing relationship with said first orifice during said second portion of said predetermined extent of rotation.

32. The method of claim 25, wherein said first portion of said predetermined extent of rotation further includes another portion of said stem for limiting the rotation-direction of said cam portion.

* * * * *